(12) United States Patent
Chen et al.

(10) Patent No.: US 7,292,792 B2
(45) Date of Patent: Nov. 6, 2007

(54) HIGH SPEED MODULATION OF OPTICAL SUBCARRIERS

(75) Inventors: Young-Kai Chen, Berkeley Heights, NJ (US); Andreas Leven, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 750 days.

(21) Appl. No.: 10/674,722

(22) Filed: Sep. 30, 2003

(65) Prior Publication Data

US 2005/0068887 A1    Mar. 31, 2005

(51) Int. Cl.
*H04B 10/04* (2006.01)
(52) U.S. Cl. .................. 398/183; 398/182; 398/188; 398/189; 398/191; 398/192; 398/194; 398/198; 398/161; 398/102; 398/82; 398/79; 398/158; 398/159; 398/185; 398/186; 398/187
(58) Field of Classification Search ............. 398/182, 398/183, 185, 186, 188, 189, 190, 191, 192, 398/193, 199, 198, 161.82, 79, 102, 194, 398/158, 159, 187
See application file for complete search history.

(56) References Cited

U.S. PATENT DOCUMENTS

2003/0058504 A1* 3/2003 Cho et al. ............... 359/161

OTHER PUBLICATIONS

U.S. Appl. No. 10/443,328, filed May 22, 2003, A. Leven.
U.S. Appl. No. 10/133,469, filed Apr. 26, 2002, Y.K. Chen.
Jemison, W.D., et al., "*Microwave Photonic Vector Modulator for High-Speed Wireless Digital Communications*," IEEE Microwave and Wireless Components Letters, vol. 12, No. 4, pp. 125-127, Apr. 2002.
McPherson, D.S., et al., "*Vector Modulator for W-Band Software Radar Techniques*," IEEE Transactions on Microwave Theory and Techniques, vol. 49, No. 8, pp. 1451-1461, Aug. 2001.
Chandramouli, S., et al., "*Direct Carrier Modulation for Wireless Digital Communications Using an Improved Microwave-Photonic Vector Modulator (MPVM) Approach*," IEEE MTT-S Digest, pp. 1293-1296, May 2002.
Leven, A., et al., "*Microwave Photonic Vector Modulator*," Lasers and Electro-Optics Society, 2003. LEOS 2003, the 16th Annual Meeting of the IEEE, vol. 2, pp. 935-936, 2003.
Walker, R.G., "*High-Speed III-V Semiconductor Intensity Modulators*," IEEE Journal of Quantum Electronics, vol. 27, No. 3, pp. 654-667, May. 1991.
Leuthold, J., et al., "*Multimode Interference Couplers with Tunable Power Splitting Ratios*," Journal of Lightwave Technology, vol. 19, No. 5, pp. 700-707, May 2001.
Tucker, R.s., et al., "*Optical Time-Division Multiplexing For Very High Bit-Rate Transmission*," Journal of Lightwave Technology, vol. 6, No. 11, pp. 1737-1749, Nov. 1988.

* cited by examiner

*Primary Examiner*—Hanh Phan
(74) *Attorney, Agent, or Firm*—John F. McCabe (57) ABSTRACT

A method for transmitting digital data includes splitting a coherent optical carrier having a subcarrier into mutually coherent optical carriers, producing corresponding sequences of phase shifts in each of the mutually coherent optical carriers, and then, interfering the mutually coherent optical carriers. The interfering produces an output optical carrier whose subcarrier has modulated inphase and quadrature components with a corresponding sequence of pairs of values. The pairs of values of the modulated inphase and quadrature phase components produced by the interfering correspond to a sequence of coordinate pairs for the signal points the 4-PSK 2D, 16-QAM 2D, or 16-PSK 2D constellation.

20 Claims, 10 Drawing Sheets

HIGH SPEED MODULATION OF OPTICAL SUBCARRIERS

The Government has a paid-up license in this invention and the right in limited circumstances to require the patent owner to license others on reasonable terms as provided for by the terms of Contract No. MDA 972-02-C-0046 awarded by DARPA.

BACKGROUND

1. Field of the Invention

This invention relates to optical and wireless transmission of digital data.

2. Description of the Related Art

Some schemes transmit digital data encoded as a modulation on an optical subcarrier. An optical subcarrier is a periodic amplitude modulation on a substantially monochromatic optical carrier. An unmodulated optical subcarrier may be produced by amplitude modulating an output from a continuous wave laser or by interfering light from two continuous wave lasers with nearby wavelengths. The unmodulated optical subcarrier has wavelength that is much longer than the wavelength of the underlying optical carrier.

Present methods and systems use complex modulators and modulation schemes to transmit data via a modulation of an optical subcarrier. Improved methods and systems for transmitting data on optical subcarriers are desirable.

SUMMARY

Various embodiments provide for transmission of digital data via modulation of both inphase and quadrature phase components of an optical subcarrier. The modulated amplitudes of these components form points of simple 2-dimensional (2D) constellations with four or more signal points. Such 2D constellations enable the transmission of two or more bits of digital data per symbol interval.

In one aspect, a method for transmitting digital data includes splitting a coherent optical carrier having a subcarrier into mutually coherent optical carriers, producing corresponding sequences of phase shifts in each mutually coherent optical carrier, and interfering the mutually coherent optical carriers. The interfering step produces an output optical carrier with a modulated subcarrier. The modulated subcarrier has inphase and quadrature components with a sequence of pairs of values.

The pairs of values of modulated inphase and quadrature phase components produced by the interfering step also correspond to a sequence of coordinates for signal points of the 4-PSK, 16-QAM, or 16-PSK 2D constellation.

In some embodiments, the method includes time delaying the subcarrier of each mutually coherent optical carrier between the splitting and interfering. The magnitudes of differences between the time delays of different ones of the mutually coherent optical carriers may differ from an integer number of subcarrier periods by at least 0.1 times the subcarrier's period.

In some embodiments, the method includes splitting the coherent optical carrier into four mutually coherent second optical carriers, producing second sequences of second phase shifts on each mutually coherent second optical carrier, and then, interfering the mutually coherent second optical carriers. This second interfering step produces a subcarrier having a second sequence of paired values of modulated inphase and quadrature components. The paired values of the modulated inphase and quadrature phase components of the second sequence correspond to coordinates of signal points of the 4-PSK, offset 4-PSK, or trapezoid 2D constellation.

In another aspect, a system for optically transmitting data includes an electro-optical modulator and a controller. The modulator is capable of receiving an optical carrier with a subcarrier. The controller is configured to apply a stream of sets of control voltages to the electro-optical modulator responsive to receiving a stream of digital data. The modulator outputs an optical carrier with a modulated subcarrier in response to each applied set of control voltages. The modulator responds to the stream of sets of control voltages from the controller by modulating the subcarrier to produce a stream of modulated pairs of values for inphase and quadrature phase components thereof. The pairs of values correspond to coordinates of signal points of the 4-PSK, the 16-QAM, or 16-PSK 2D constellation.

In some embodiments of the system, the pairs of values correspond to coordinates of signal points of the 4-PSK, 16-QAM, or 16-PSK 2D constellation to 5% or better.

In some embodiments of the system, the electro-optical modulator includes a pair of cascaded first and second electro-optical modulators. The first modulator is configured to respond to the sets of the control voltages by modulating the subcarrier to produce a stream of modulated pairs of second values for inphase and quadrature phase components thereof. The pairs of second values correspond to coordinates of signal points of the 4-PSK, trapezoid, or offset 4-PSK 2D constellation.

In some embodiments of the system, the modulator includes an optical splitter with four outputs for receiving the optical carrier, an optical combiner with four inputs, and four optical waveguides. Each waveguide connects one of the outputs of the splitter to one of the inputs of the combiner such that each input is connected to one output. The waveguides include electro-optical modulators connected to received sets of the control voltages applied by the controller. In some embodiments, magnitudes of differences between the lengths of any two of the waveguides differ from an integer number of subcarrier wavelengths by at least 0.1 times the subcarrier's wavelength.

In another aspect, a system includes an electro-optical modulator and a controller. The electro-optical modulator includes an optical splitter with four outputs, an optical combiner with four inputs, and four waveguides. The optical splitter is configured to receive an optical carrier wave. The waveguides connect the outputs to the inputs such that each input is connected to one of the outputs. Each waveguide has an electro-optical phase shifter that is responsive to applied voltages. The controller is configured to apply one of a plurality of sets of control voltages to the electro-optical phase shifters in response to receiving a set of digital data. In response to each applied one of the sets of control voltages, the combiner outputs the optical carrier with a modulated subcarrier. The modulator responds to the sets of control voltages by modulating values of the inphase and quadrature phase components of the subcarrier such that the modulated pairs of values correspond to coordinates of signal points of a 2D signal constellation. The constellation has signal points with equal lengths.

BRIEF DESCRIPTION OF THE DRAWINGS

In the various Figures and text, like reference numerals, e.g., up to primes, double primes and/or letters, indicate elements with similar functions.

DETAILED DESCRIPTION OF EMBODIMENTS

Figure 1A:
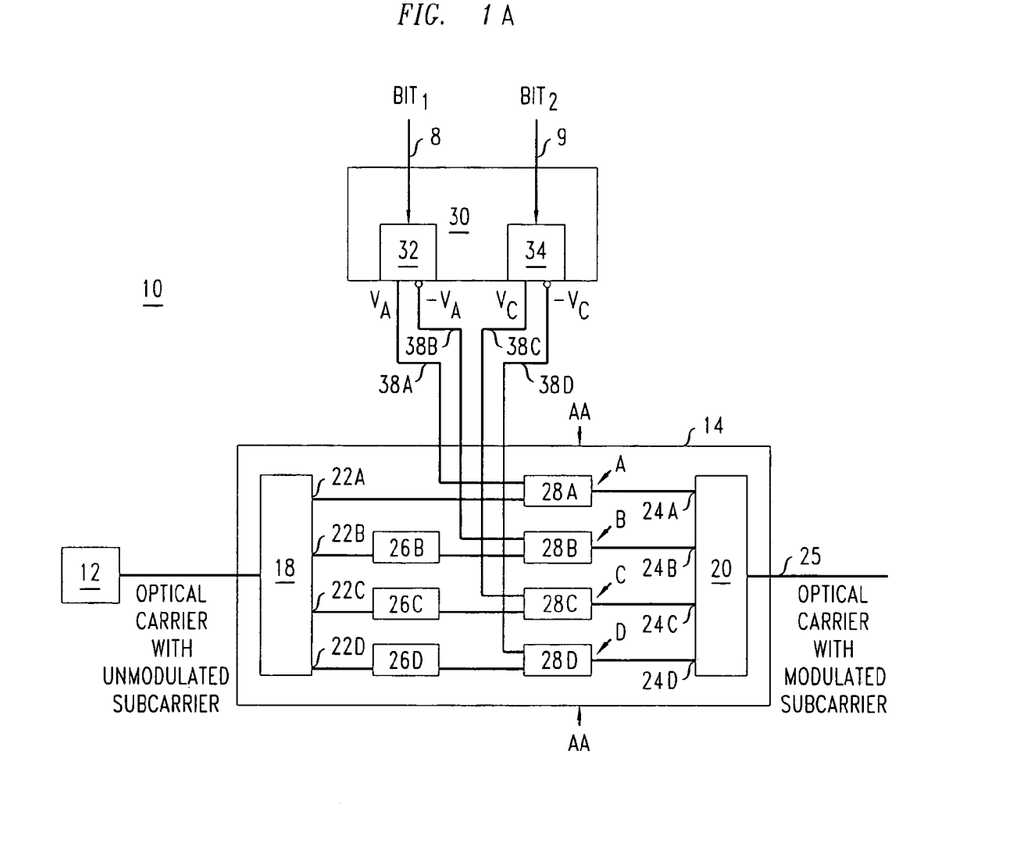
FIG. 1A is a top view of an optical transmitter that generates a modulation pattern on an optical subcarrier corresponding to signal points of a 4-point 2D constellation.
Figure 1B:
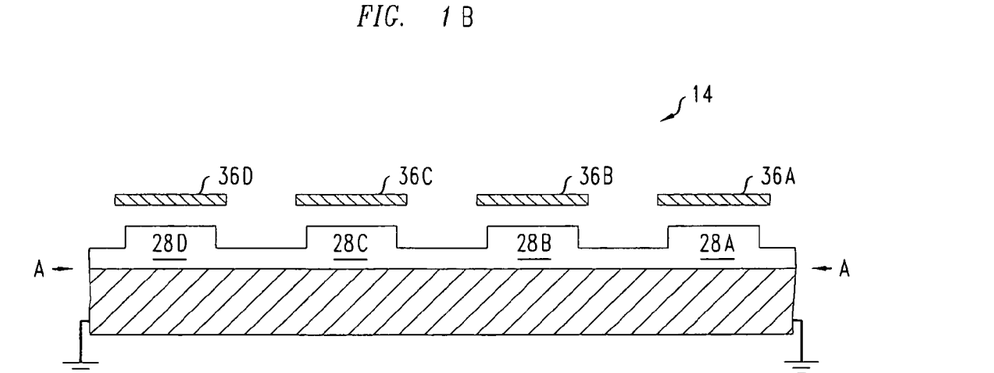
FIG. 1B is a cross-sectional view of optical modulator of FIG. 1A at the vertical plane containing line AA-AA.

FIG. 1A-1B show an optical transmitter 10 that is configured to encode digital data into the amplitudes of the inphase and quadrature phase components of an optical subcarrier. The transmitter 10 includes a light source 12, an electro-optical modulator 14, and an electrical controller 16. The light source 12 produces a coherent optical carrier wave with an unmodulated optical subcarrier, i.e., a constant amplitude subcarrier of one frequency. Herein, wavelengths of optical subcarriers are at least 20 times as long as those of the optical carriers and are preferable 100 or more times those of the optical carriers. The electro-optical modulator 14 modulates the amplitude of both the inphase and the quadrature phase components of the optical subcarrier. The electrical controller 16 produces voltages on lines 38A-38D to control the modulation of the optical subcarrier by the optical modulator 14. Examples of optical transmitters that produce optical carrier waves with modulated subcarriers are described in U.S. patent application Ser. No. 10/133,469 filed by Young-Kai Chen and Andreas Leven on Apr. 26, 2002, which is incorporated by reference herein in its entirety.

The optical modulator 14 includes optical splitter 18, optical combiner 20, and four optical waveguides A, B, C, D. The optical splitter 18 has an input port 17 that receives a coherent optical carrier wave from optical source 12 and produces mutually coherent output optical waves on output ports 22A, 22B, 22C, 22D. The optical combiner 20 combines mutually coherent optical waves, which are received at input ports 24A, 24B, 24C, 24D to produce one optical carrier wave with a modulated subcarrier at output port 25. A separate waveguide A-D connects each output port 22A, 22B, 22C, 22D of the optical splitter 18 to one input port 24A, 24B, 24C, 24D of the optical combiner 20 so that one output port 22A, 22B, 22C, 22D connects to each input port 24A, 24B, 24C, 24D. The optical splitter 18 and optical combiner 20 may be single-mode or multi-mode interference couplers.

Along optical waveguides A-D, carrier and subcarrier phases of the different mutually coherent waves evolve separately. In particular, the waveguides A-D include optical delay elements 26B, 26C, 26D, and nominally identical electro-optically controllable phase shifters 28A, 28B, 28C, 28D. The optical delay elements 26B, 26C, 26D produce fixed relative delays $T_B$, $T_C$, and $T_D$ between the subcarriers of the optical carrier waves in respective the optical waveguide B, C, and D and the subcarrier of the optical carrier wave in optical waveguide A. The $T_B$, $T_C$, and $T_D$ typically have magnitudes that differ by at least $0.1\ T_{SC}$ from an integer number times subcarrier's period, $T_{SC}$. Magnitudes of the differences between propagate times of the optical carrier waves through waveguides A, B, C, and D also differ from an integer times $T_{SC}$ by at least $0.1\ T_{SC}$. The electro-optical phase shifters 28A, 28B, 28C, 28D are substantially identical electro-optically active portions of the optical waveguides A-D. The electro-optical phase shifters 28A-28D shift phases of optical carriers, e.g., by 0 to $2\pi$, in a manner responsive to voltages applied thereto. Applied DC bias voltages preset the electro-optical phase shifters 28A-28D so that waveguides A-D contribute inphase optical carrier waves at output port 25 in the absence of other applied voltages. During operation, lines 38A, 38B, 38C, and 38D apply control voltages $V_A$, $-V_A$, $V_C$, and $-V_C$ so that the electro-optical phase shifters 28A-28D modulate phases of the carrier waves in a manner responsive to the input data received from the input ports 8, 9.

The electrical controller 16 includes a controller 30 and first and second variable voltage sources 32, 34. The first and second voltage sources 32, 34 produce control voltage pair ($V_A$, $-V_A$) and control voltage pair ($V_C$, $-V_C$), respectively. Each pair of control voltages is responsive to a corresponding bit of digital data received at data input 8 or data input 9. The control voltage pairs ($V_A$, $-V_A$) and ($V_C$, $-V_C$) operate respective electrode pairs (36A, 36B) and (36C, 36D) in differential modes, which are less sensitive to DC noise. The control voltages $V_A$, $V_C$ fix the relative phases that are induced in the mutually coherent optical carriers by optical phase shifters 28A, 28B, 28C, 28D. These phases determine how these optical carrier waves will interfere at output port 25 of optical combiner 20.

The optical transmitter 10 receives and encodes two bits of digital data per symbol period. Voltage signals for the two bits of data are received at input data lines 8, 9 of electrical controller 16 and are then, encoded into the amplitudes of the respective inphase and quadrature components of the optical subcarrier by optical modulator 14. Control voltages $V_A$, $V_C$ and subcarrier delays $T_B$, $T_C$, and $T_D$ from time delay elements 26B, 26C, 26D determine how optical modulator 14 modulates the inphase and quadrature phase components of the optical subcarrier. The control voltages $V_A$ and $V_C$ and subcarrier delays $\{T_C, T_B, T_D\}$ are selected so that modulated values correspond to the coordinates of the four signal points of a selected 2-dimensional (2D) constellation. In particular, the pairs of modulated amplitudes for the inphase and quadrature phase components of the optical subcarrier or linear combinations thereof will correspond to "x" and "y" coordinates of signal points in the 2D constellation.

In a 2D constellation, the signal points are vectors in the complex plane, i.e., vectors directed from the origin to associated complex numbers on the plane.

If $\{A_1, A_2, A_3, A_4\}$ are the complex numbers that represent the four signal points of a 2D constellation, optical modulator 10 will produce a modulated subcarrier representing these points if the fixed delays $\{T_B, T_C, T_D\}$ and four sets of carrier phase shifts, i.e., $\{\phi_j(m)\}$ for m=1, 2, 3, 4, satisfy the following four equations.

$$\sum_{a=A,B,C,D} \{\exp(j[-\varphi_a(m) + \pi f_{SC} T_a])\} \quad (1)$$

$$\sum_{b=A,B,C,D} \{\exp(j[\varphi_b(m) + \pi f_{SC} T_b])\} = A_m.$$

A set of solutions pf equation (1) defines the fixed delays $\{T_a\}$ produced by delay elements 26B-26D and the relative phases $\{\phi_a(m)\}$ produced by the sets of control voltages applied by sources 32, 34. Here, $T_A$=0. It is desirable that the sets of control voltages on lines 38A-38D be four voltage sets such as $\{V_{A,low}, V_{C,low}\}$, $\{V_{A,low}, V_{C,high}\}$, $\{V_{A,high}, V_{C,low}\}$, and $\{V_{A,high}, V_{C,high}\}$, because such sets allow for differential binary encoding. Since controller 30 operates nominally identical phase shifters 28A, 28B, 28C, 28D in a differential mode and phase shifts are proportional to the applied control voltages. The phase shifts satisfy: $\phi_A(m)=-\phi_B(m)$ and $\phi_C(m)=-\phi_D(m)$. Thus, each solution of equation (1) for which $\phi_A(m)=-\phi_B(m)$ and $\phi_C(m)=-\phi_D(m)$ provides fabrication parameters for the modulator 14 and four sets of allowed control voltages for the controller 30 in an embodiment, which produces the desired 2D constellation.

Herein, a set of points $\{B_m\}$ in the plane corresponds the signal points of a constellation if there is a set of signal points $\{A_m\}$ representing the constellation for which the ratio $|B_m-A_m|/|A_m|$ is less than 0.10 for each value of index m. Preferably for such a corresponding set of points $\{B_m\}$, the above ratios are less than 0.05, and more preferably the above ratios are less than 0.01. A variety of sets of complex numbers $\{A_m\}$ can represent a 2D constellation. In particular if $\{A_m\}$ represents a 2D constellation, then $\{\lambda A_m\}$ represents the same 2D constellation where $\lambda$ is any nonzero complex number. That is, a global rotation and/or a finite global rescaling of the signal points of any representation of a 2D constellation give an equivalent representation the same 2D constellation.

Numerical solutions to equation (1) give fabrication and operating parameters that generate several 2D constellations. The fabrication parameters include the subcarrier delays $\{T_j\}$ produced by delay elements 26B-26D. The operating parameters are the four sets of operating voltages $\{V_A(m), V_C(m)\}$, i.e., one set for each signal point. The solutions enable, at least, the production of modulated subcarriers whose inphase and quadrature phase components correspond to coordinates of signal points for the 2D constellations shown in FIGS. 2-4.

Figure 2:
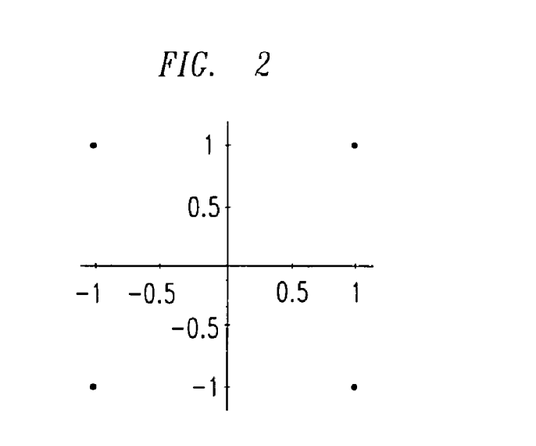
FIG. 2 shows a representation of the four-point phase shift keyed (4-PSK) constellation.

FIG. 2 shows the signal points of an exemplary four-point phase shift keyed (4-PSK) 2D constellation. In a 4-PSK 2D constellation, the signal points are vectors of equal length. The vectors form a pattern invariant under rotations of 90 degrees about the origin and are represented by the complex numbers: 1+j, 1−j, −1+j, and −1−j where "j" is the square root of −1. Generally, the 4-PSK 2D constellation has four vectors that radiate from the origin and have arbitrary but equal lengths. In the pattern, the four vectors are separated by rotational angles 90°, but in various representations one vector can be at an arbitrary angle with respect to the real axis.

With respect to the 4-PSK constellation, one solution for fabrication parameters, i.e., delays $T_j$, and sets of control voltages, i.e., $\{V_A(m), V_C(m)\}$, is as follows. The $T_B$, $T_C$, and $T_C$ are given by $5/(8f_{SC})$, $1/(2f_{SC})$, and $7/(8f_{SC})$, respectively. To each of these delays may be added any integral multiple of the subcarrier period, $T_{SC}$, of optical source 12. The four sets of control voltages, $\{V_A, V_C\}$, have the following values: $\{+0.5V_\pi, -0.375V_\pi\}$; $\{+0.5V_\pi, +0.625V_\pi\}$; $\{+1.0V_\pi, -0.375V_\pi\}$; and $\{+1.0V_\pi, +0.625V_\pi\}$. Here, applying voltage V, to one of the electro-optical phase shifter 28A, 28B, 28C, 28D produces an added shift to the phase of the optical carrier by $\pi$ more than an applied voltage of zero.

Figure 3:
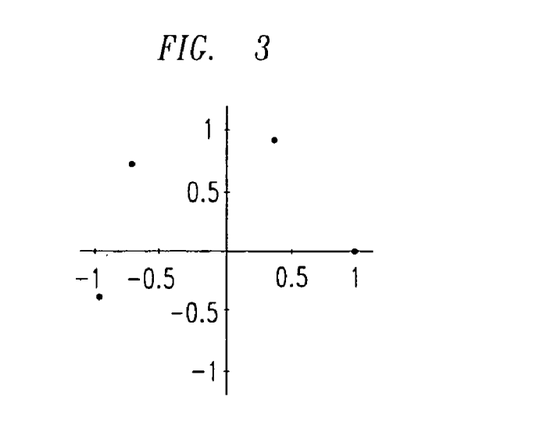
FIG. 3 show a representation of a trapezoid 2D constellation.
Figure 4:
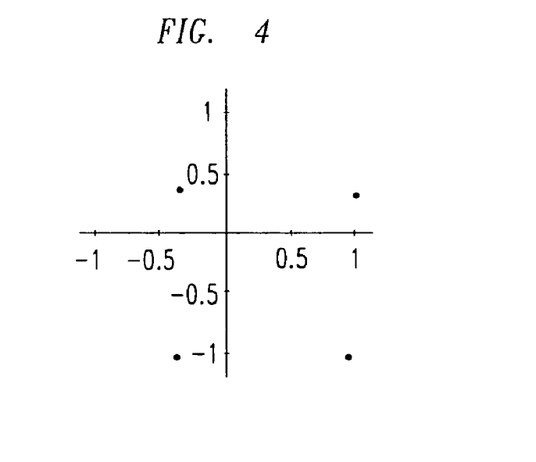
FIG. 4 shows a representation of an offset 4-PSK 2D constellation.

FIG. 3 and FIG. 4 show sets of signal points that represent other 4-point 2D constellations. In the 2D constellation of FIG. 3, the exemplary signal points are complex numbers of length one. The numbers define the ends of vectors radiating from the origin. The four vectors of the representation are formed by counter clockwise rotations about the origin of the vector to the point "1" by 0°, 67.5°, 135°, and 202.5°. The four vectors of FIG. 3 represent a 2D constellation referred to as the trapezoid 2D constellation. In the 2D constellation of FIG. 4, the exemplary signal points are vectors radiating from the origin to end points at the complex numbers: 1+j/3, −⅓+j/3, −⅓−j, and 1−j. The four vectors of FIG. 4 represent a 2D constellation herein referred to as the offset 4-PSK 2D constellation. Other representations of these above 2D constellations are obtained by replacing one or more specific vectors of the above representations by vectors that are rotated from the one or more specific vectors by integer multiples of 90°. Yet other representations are obtained by multiplying the complex numbers for all four vectors of a representation by the same nonzero complex number.

For the 2D constellation of FIG. 3, exemplary subcarrier delays and sets of control voltages are defined as follows. The subcarrier delays $T_B$, $T_C$, and $T_D$ are given by: $0.4965/f_{SC}$, $0.4821/f_{SC}$, and $0.9856/f_{SC}$, respectively, wherein individual delays may be shifted by any integral multiple of $T_{SC}$. The four sets of control voltages $\{V_A, V_C\}$ are: $\{-0.9934V_\pi, -0.4787V_\pi\}$, $\{-0.5624V_\pi, +0.4848V_\pi\}$; $\{-0.9934V_\pi, +0.4848V_\pi\}$; and $\{-0.5624V_\pi, -0.4787V_\pi\}$. The delays $\{T_j\}$ and sets of relative phase shifts $\{\phi_A(m), -\phi_A(m), \phi_C(m), \phi_C(m)\}$ for the above sets of control voltages solve equation (1) for the signal points of the 2D constellation of FIG. 3.

For the 2D constellation of FIG. 4, exemplary subcarrier delays and sets of control voltages are defined as follows. The delay times $T_B$, $T_C$, and $T_D$ are given by: $0.7104/f_{SC}$, $0.3962/f_{SC}$, and $0.6353/f_{SC}$, respectively, wherein individual delays may be shifted by any integral multiple of $T_{SC}$. The four sets of control voltages $\{V_A, V_C\}$ are: $\{-0.7476V_\pi, -0.4787V_\pi\}$; $\{-0.7476V_\pi, +0.4848V_\pi\}$; $\{+0.6759V_\pi, -0.4787V_\pi\}$; and $\{+0.6759V_\pi, +0.4848V_\pi\}$. The delays $\{T_j\}$ and sets of relative phase shifts $\{\phi_A(m), -\phi_A(m), \phi_C(m), -\phi_C(m)\}$ associated with the above sets of control voltages solve equation (1) when the right hand sides of that equation are the complex numbers for signal points of the 2D constellation shown in FIG. 4.

The trapezoid 2D and offset 4-PSK constellations of FIGS. 3 and 4 are used in embodiments of cascaded optical transmitters. Those embodiments produce 2D constellations with 16 or more signal points.

Figure 5:
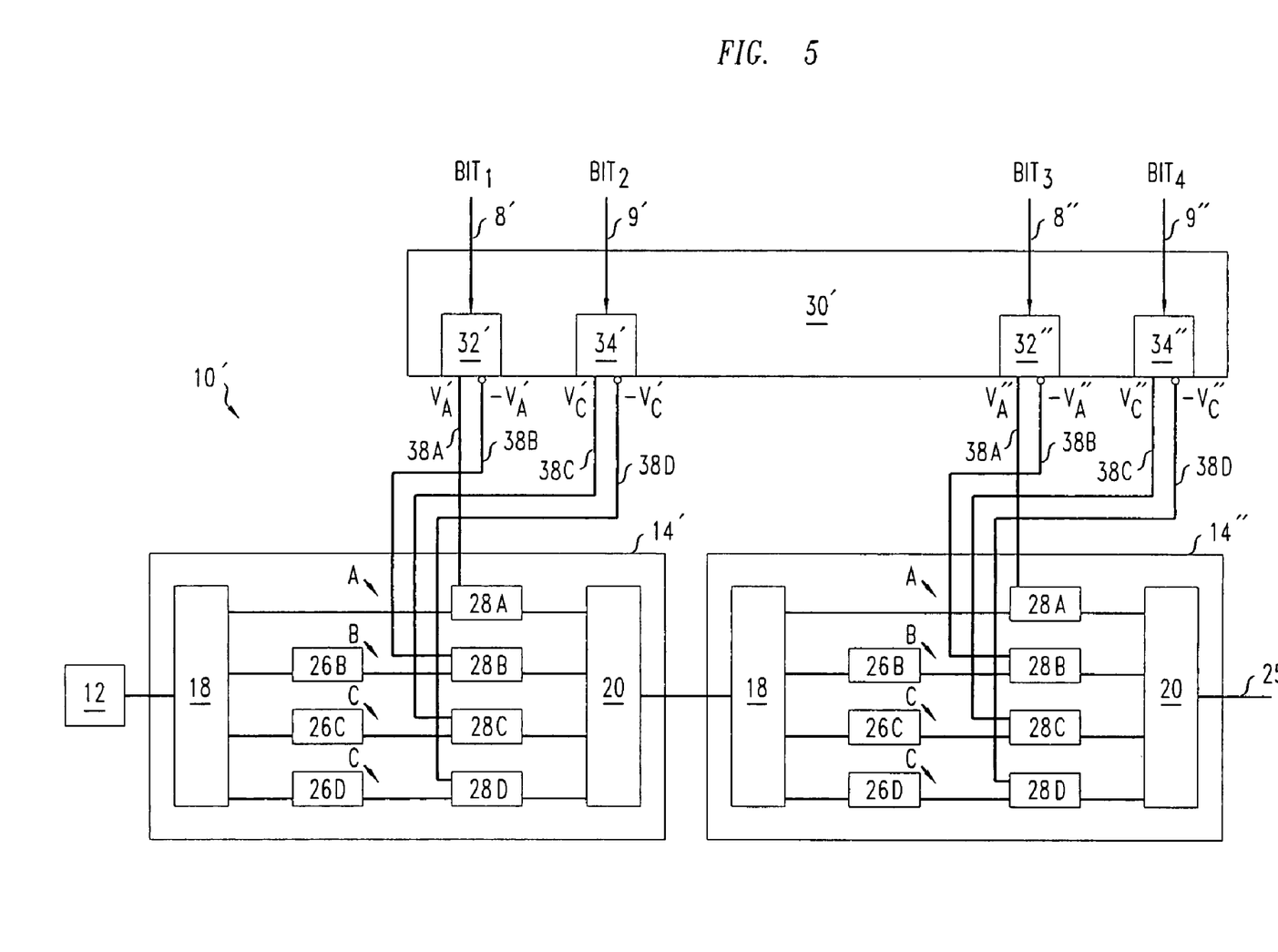
FIG. 5 is a top view of an optical transmitter that generates a modulation pattern on an optical subcarrier corresponding to signal points from a 16-point 2D constellation.

FIG. 5 shows an optical transmitter 10' configured to modulate an optical subcarrier according to a 2D constellation having 16 signal points. Again, amplitudes of the inphase and quadrature phase components of the modulated subcarrier correspond to the respective "x" and "y" coordinates of signal points of the 2D constellations.

The optical transmitter 10' includes optical source 12, two cascaded optical modulators 14', 14", and electrical controller 16'. The optical source 12 produces a coherent optical carrier with an unmodulated optical subcarrier as already described with respect to FIGS. 1A-1B. The optical modulators 14', 14" have structures already described with respect to optical modulator 14 of FIGS. 1A-1B. The electrical controller 16' includes a first pair of voltage sources (32', 34') and second pair of voltage sources (32", 34"). The first and second pairs produce a first set of control voltages $\{V_A', -V_A', V_C', -V_C'\}$ and a second set of control voltages $\{V_A'', -V_A'', V_C'', -V_C''\}$, respectively. The first control voltages $V_A', -V_A', V_C'$, and $-V_C'$ control respective electro-optical phase shifters 28A, 28B, 28C, and 28D of the first optical modulator 14'. The second control voltages $V_A'', -V_A'', V_C''$, and $-V_C''$ control respective electro-optical phase shifters 28A, 28B, 28C, and 28D of the second optical modulator 14". The voltage sources 32', 34' and voltage sources 32", 34" produce control voltages responsive to pairs of data bits received at input ports 8', 9' and input ports 8", 9", respectively. Thus, data bits from input ports 8', 9' control the modulation pattern produced by first optical modulator 14', and data bits from input ports 8", 9" control the modulation pattern produced by second optical modulator 14".

Each pair of voltage sources (32', 34') and (32", 34") encodes two bits of digital data onto the optical subcarrier per symbol period. For that reason, each pair of voltage sources and associated optical modulator, i.e., (32', 34', 14') and (32", 34", 14"), modulates the optical subcarrier to carry signal points in a 2D constellation having four points. The cascaded pair of optical modulators 14', 14" produces signal points in a 2D constellation having sixteen signal points.

In some embodiments, the first and second optical modulators 14', 14" and associated voltage sources (32', 34'), (32", 34") produce signal points in different 2D constellations. Some such embodiments of optical transmitter 10' modulate an optical subcarrier to carry of signal points in the 2D constellations of FIG. 7A or 7B.

Figure 7A:
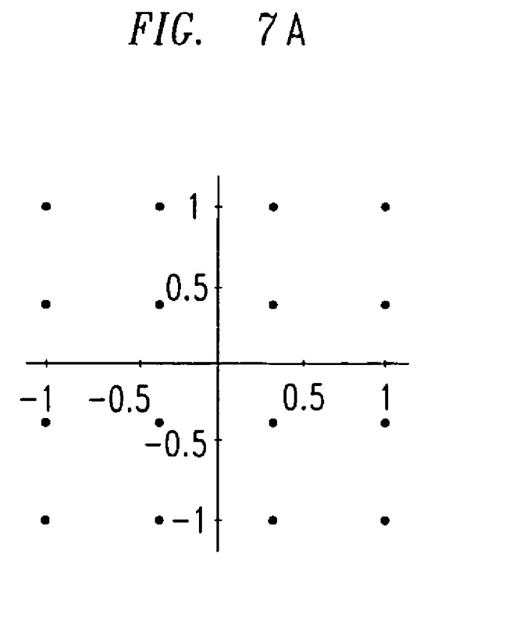
FIG. 7A shows a representation of the 16-point QAM constellation that some embodiments of the modulator of FIG. 5 produce on an optical subcarrier.

FIG. 7A shows an exemplary representation of the 16-point quadrature amplitude modulated (QAM) 2D constellation. In this representation, the constellation includes sixteen signal points located at sites of a regular cubic 2D lattice. The lattice's primitive lattice vector, ⅓+j/3, is one signal point of the representation. In the representation, the other points are in the unit square and located at complex numbers: ⅓+j/3+(2a/3+2b·j/3) where "a" and "b" are integers.

Figure 7B:
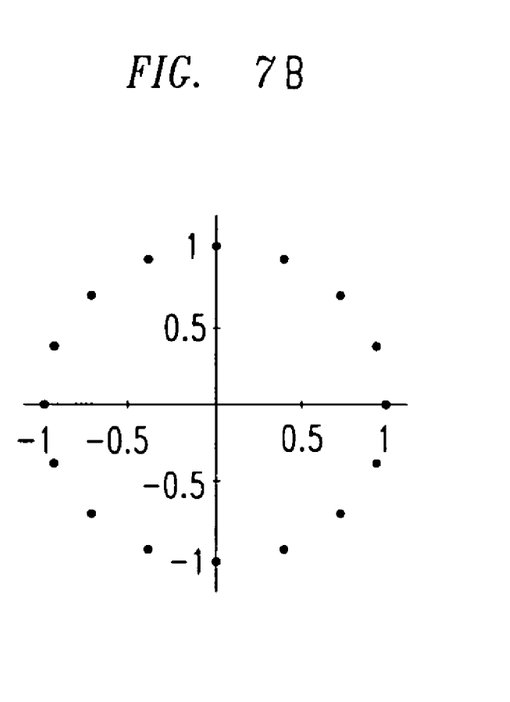
FIG. 7B shows a representation of the 16-point PSK constellation that some embodiments of the modulator of FIG. 5 produce on an optical subcarrier.

FIG. 7B shows an exemplary representation of the 16-PSK 2D constellation. In this representation, the signal points are vectors radiating from the origin and having length one. The various vectors of the representation can be obtained by clockwise rotations of the vector through the complex number "1" by integral multiples of 22.5 degrees.

Other representations of the 2D constellations of FIGS. 7A and 7B can be obtained by multiplying the complex numbers for all signal points of a representation by the same nonzero complex number, i.e., a global rotation and/or rescaling.

Referring to FIG. 5, one embodiment of optical transmitter 10' modulates an optical subcarrier so that the amplitudes of its inphase and quadrature components correspond to signal points of the 16-QAM constellation. In this embodiment, first voltage sources 32', 34' and time delays 26B-26D of first optical modulator 14' cause the optical subcarrier from optical source 12 to be modulated according to the 4-PSK constellation of FIG. 2. In an exemplary embodiment, the first optical modulator 14', $T_B$, $T_C$, and $T_C$ are equal to $5/(8f_{SC})$, $1/(2f_{SC})$, and $7/(8f_{SC})$, respectively, up to integral multiples of $T_{SC}$. Also, exemplary control voltage sets $\{V_A', V_C'\}$ for the first modulator 14' have the following values: $\{+0.5V_\pi, -0.375V_\pi\}$; $\{+0.5V_\pi, +0.625V_\pi\}$; $\{+1.0V_\pi, -0.375V_\pi\}$; and $\{+1.0V_\pi, +0.625V_\pi\}$. In these embodiments, second voltage sources 32", 34" and time delays 26B-26D of second optical modulator 14" cause the optical subcarrier from the first optical modulator 14' to be further modulated according to the 4-point constellation of FIG. 4. In an exemplary embodiment, the second optical modulator 14", $T_B$, $T_C$, and $T_D$ are equal to $0.7104/f_{SC}$, $0.3962/f_{SC}$, and $0.6353/f_{SC}$, respectively, up to integral multiples of $T_{SC}$. Also, exemplary sets of control voltage $\{V_A'', V_C''\}$ for the second modulator 14" are: $\{-0.7476V_\pi, -0.4787V_\pi\}$; $\{-0.7476V_\pi, +0.4848V_\pi\}$; $\{+0.6759V_\pi, -0.4787V_\pi\}$; and $\{+0.6759V_\pi, +0.4848V_\pi\}$.

Another embodiment of optical transmitter 10' that modulates an optical subcarrier according to the 16-QAM 2D constellation, interchanges the first and second pairs of voltage sources (32', 34') and (32", 34") and interchanges the first and second optical transmitters 14' and 14" with respect the above-described embodiment. That is, in this embodiment, the first and second optical modulators 14', 14" produce signal points of the constellations of FIG. 4 and FIG. 2, respectively.

Another embodiment of optical transmitter 10' of FIG. 5 modulates an optical subcarrier so that amplitudes of its inphase and quadrature components correspond to signal points of the 16-PSK 2D constellation of FIG. 7B. In this embodiment, the first voltage sources 32', 34' and time delays 26B-26D of the first optical modulator 14' cause the optical subcarrier from optical source 12 to be modulated according to the 4-PSK constellation of FIG. 2. In an exemplary embodiment, the first optical modulator 14', $T_B$, $T_C$, and $T_C$ are equal to $5/(8f_{SC})$, $1/(2f_{SC})$, and $7/(8f_{SC})$, respectively, up to any integral multiples of $T_{SC}$. Also, exemplary control voltage sets $\{V_A', V_C'\}$ for the first optical modulator 14' have the following values: $\{+0.5V_\pi, -0.375V_\pi\}$; $\{+0.5V_\pi, +0.625V_\pi\}$; $\{+1.0V_\pi, -0.375V_\pi\}$; and $\{+1.0V_\pi, +0.625V_\pi\}$. In these embodiments, the second voltage sources 32", 34" and time delays 26B-26D of the second optical modulator 14" cause the optical subcarrier from the first optical modulator 14' to be further modulated according to the 4-point constellation of FIG. 3. In an exemplary embodiment, the second optical modulator 14", $T_B$, $T_C$, and $T_D$ are equal to $0.4965/f_{SC}$, $0.4821/f_{SC}$, and $0.9856/f_{SC}$, respectively, up to any integral multiples of $T_{SC}$. Also, exemplary control voltage sets $\{V_A, V_C\}$ for the second modulator 14" have the following values: $\{-0.9934V_\pi, -0.4787V_\pi\}$, $\{-0.5624V_\pi, +0.4848V_\pi\}$; $\{-0.9934V_\pi, +0.4848V_\pi\}$; and $\{-0.5624V_\pi, -0.4787V_\pi\}$.

Finally, another embodiment of optical transmitter 10' that modulates an optical subcarrier according to the 16-PSK 2D constellation, interchanges the first and second pairs of voltage sources (32', 34') and (32", 34") and interchanges the first and second optical transmitters 14' and 14" with respect the above-described embodiment. That is, in this embodiment, the first and second optical modulators 14', 14" produce signal points of the constellations of FIG. 3 and FIG. 2, respectively.

Figure 6A:
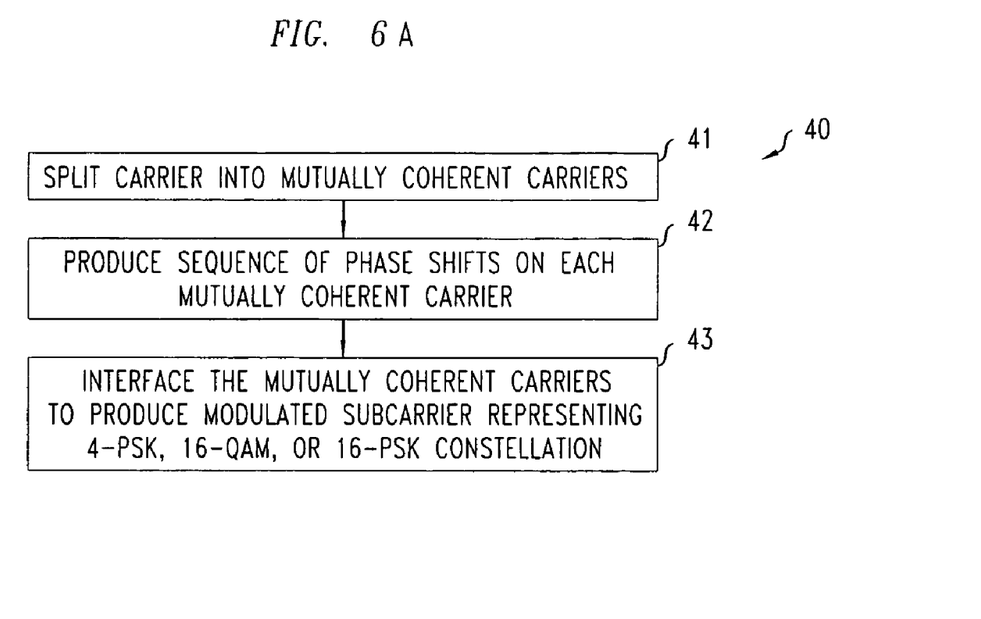
FIG. 6A is a flow chart for a method of transmitting digital data, e.g., using a transmitter of FIG. 1A-1D or 5.

FIG. 6A shows one method 40 for transmitting digital data, e.g., using a transmitter 10, 10' of FIG. 1A-1D or 5. The method 40 includes splitting a coherent optical carrier having a subcarrier into mutually coherent optical carriers (step 41). The method 40 includes producing sequences of phase shifts in each of the mutually coherent optical carriers (step 42). The method 40 also includes interfering the mutually coherent optical carriers to produce an output optical carrier whose subcarrier has modulated inphase and quadrature components (step 43). Time delays may also be produced in the subcarrier of each mutually coherent optical carrier between performing the steps of splitting and interfering. The pairs of values of the modulated inphase and quadrature phase components produced by the interfering correspond to coordinate pairs for the signal points of the 4-PSK 2D constellation, the 16-QAM 2D constellation, or the 16-PSK 2D constellation.

Figure 6B:
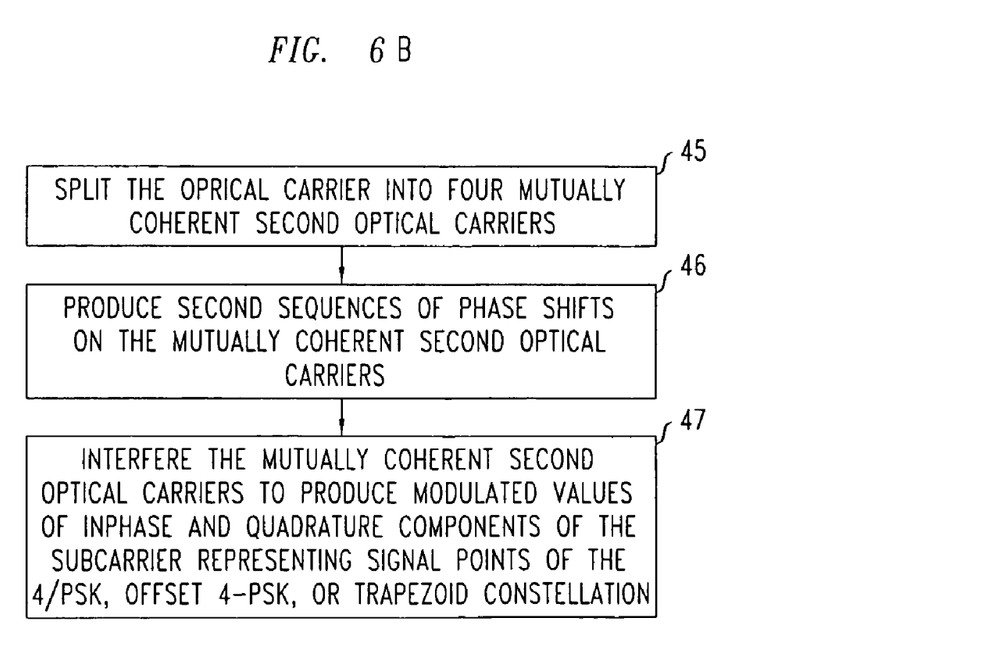
FIG. 6B is a flow chart showing additional steps of some embodiments of the method of FIG. 6A.

Referring to FIG. 6B, some embodiments of the method 40 of FIG. 6A include the following steps. First, the coherent optical carrier is split into four mutually coherent second optical carriers (step 45). Next, second sequences of second phase shifts are produced on each of the mutually coherent second optical carriers (step 46). Then, the mutually coherent second optical carriers are interfered to produce a subcarrier having a second sequence of pairs of modulated inphase and quadrature components (step 47). The pairs of values of the modulated inphase and quadrature phase components of the second sequence correspond to coordinate pairs for the signal points of the 4-PSK, the offset 4-PSK, or the trapezoid 2D constellation.

Some embodiments of modulators 14, 14', 14" of FIGS. 1A-1B, and 5 are integrated optical devices. In these devices, optical splitter 18, optical combiner 20, optical waveguides A-D, time delays 26B-26C, and electro-optical phase shifters 28A-28D are mesa group III-V semiconductor structures on an indium phosphide (InP) substrate. On the InP substrate, exemplary materials for optical cores and claddings are an indium aluminum gallium arsenide (InAlGaAs) alloy and an indium aluminum arsenide (InAlAs) alloy, respectively. Preferably, both alloys are lattice-matched to the InP substrate and have a bandgap of 1.3 electron volts or higher so that optical absorption is low at telecommunications wavelengths. InAlAs and InAlGaAs have refractive indexes that respond to applied voltages as required in the electro-optical phase shifters 28A-28D.

In such integrated optical devices, Schottky rib-type structures for optical waveguides and control electrodes enable better matching between velocities of radio, submillimeter, or millimeter control waves and optical carrier waves thereby increasing upper cutoff frequencies. Schottky rib-type waveguide structures are described, e.g., in an article by Robert G. Walker entitled "High-Speed III-V Semiconductor Intensity Modulators", IEEE Journal of Quantum Electronics, Vol. 27, No. 3 (1991) pages 654-667, which is incorporated by reference herein in its entirety.

Figure 13:
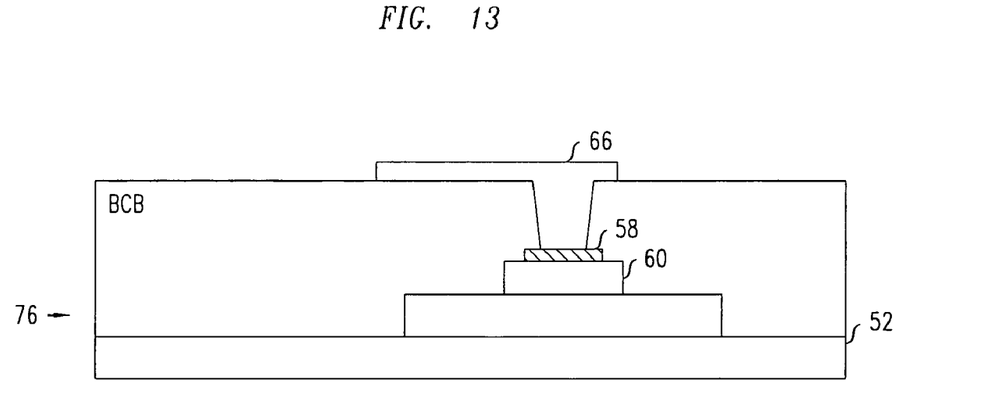
Figure 14:
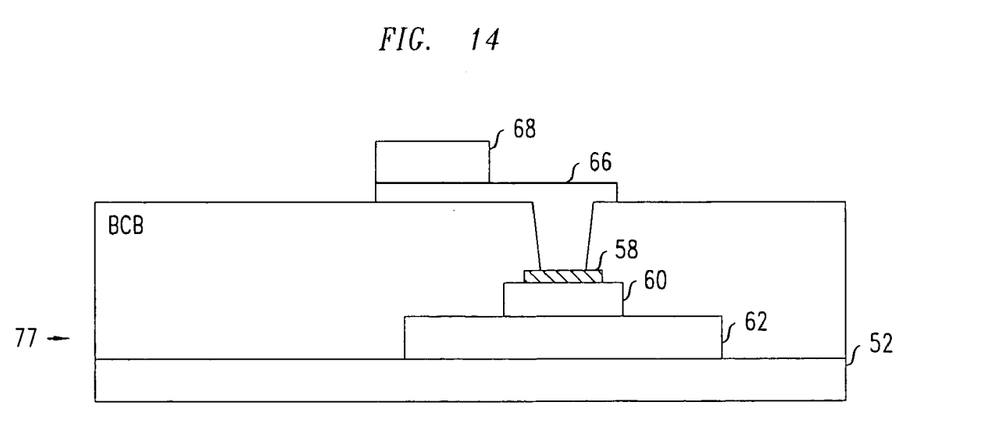
FIG. 14 is a cross-sectional view of a single electro-optical phase shifter in one integrated optical device for the optical modulators of FIGS. 1A-1B, and 5.

An exemplary method for fabricating modulators 14, 14', 14" as integrated optical devices with Schottky rib-type waveguide structures is described below. FIGS. 8-13 show portions of intermediate structures 71-76 produced in the fabrication method. FIG. 14 shows a portion 77 of the final integrated optical device that includes a waveguide and an electrode with the rib-type waveguide structure, e.g., an electro-optical phase shifter 28A-28D of FIGS. 1A-1B or 5.

The fabrication method includes epitaxially growing a multilayer structure of Group III-V semiconductor on InP substrate 52. The multilayer structure includes a lower multilayer 54 having the following top-to-bottom sublayer sequence: about 100 nm of $In_xAl_{1-x-y}Ga_yAs$, about 25 nm of InP, about 475 nm of $In_xAl_{1-x-y}Ga_yAs$, about 500 nm of intrinsic $In_zAl_{1-z}As$, and about 300 nm of n-type $In_zAl_{1-z}As$. Here, with x=0.529, y=0.335, and z=0.520. The alloy compositions of the InAlAs, InP, and InAlGaAs sublayers enable lattice matching to the InP growth substrate 52. The multilayer structure also includes an upper layer 56 of about 800 nm of the same $In_zAl_{1-z}As$ alloy as in the layer 54 thus, lattice matching the InP growth substrate 52.

The multilayer structure forms the planar optical cladding and core layers of splitter 18, combiner 20, optical waveguides A-D, time delays 26B-26D, and electro-optical phase shifters 28A-28D as shown in FIGS. 1A and 5. In layer 54, the InAlGaAs sublayers and InAlAs sublayer function as optical core and lower optical claddings for the above optical devices. InAlAs layer 56 functions as upper optical cladding of said optical devices.

In layer 54, the lower ½ of the InAlAs sublayer is heavily $n^+$-doped to function as a lower electrode of electro-optical phase shifters 28A-28D of FIGS. 1A and 5. Exemplary dopant concentrations for the lower ½ of the InAlAs sublayer are about $2 \times 10^{18}$ n-type dopant atoms per centimeter cubed ($cm^3$). Typically, the InP substrate 52 is iron-doped to be non-conductive.

Figure 8:
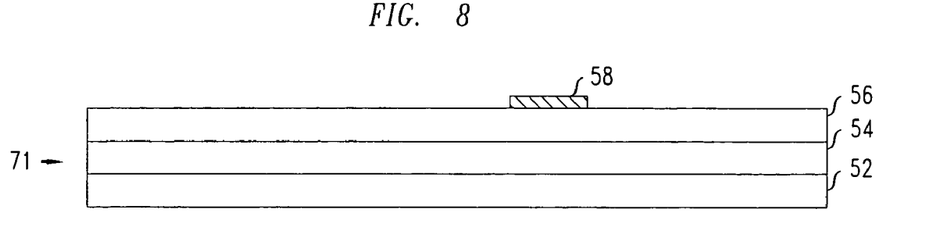
FIGS. 8-13 are cross-sectional views of intermediate structures produced during fabrication of optical modulators of FIGS. 1A-1B, and 5 as integrated optical devices.

Next, the fabrication method includes forming a metal top electrode 58 for each electro-optical phase shifter 28A-28D of FIGS. 1A-1B and 5 as shown in structure 71 of FIG. 8. Exemplary metal electrodes 58 are metal multilayers having the following bottom to top structure: about 30 nanometers (nm) of titanium (Ti), about 35 nm of platinum (Pt), about 50 nm of gold (Au), and about 40 nm of palladium (Pd). The metal top electrodes 58 overlay a lateral region of InAlAs layer 56 that will form the electro-optical phase shifters 28A-28D of FIGS. 1A-1B and 5. Forming the metal top electrodes 58 includes lithographically forming a photoresist mask to protect other lateral regions of the InAlAs layer 56, performing a series of evaporation—depositions of metal, and then, stripping the photoresist mask.

Figure 9:
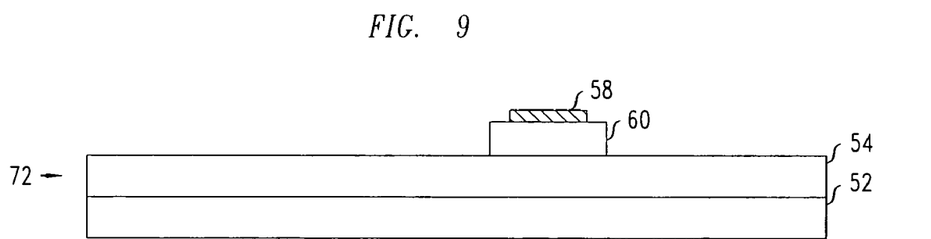
Figure 10:
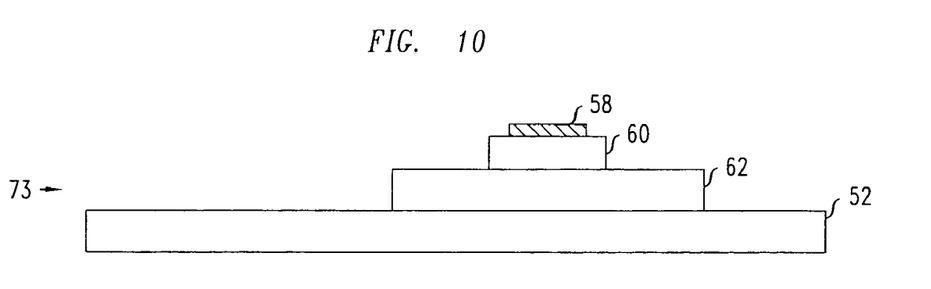

Next, the fabrication method includes performing a series of steps that produce a mesa structure 60 for upper optical cladding of the optical waveguide devices as illustrated in structure 72 of FIG. 9. The series of steps includes a plasma enhanced chemical vapor deposition (PECVD) of about 40 nm of protective $SiO_2$ on a top surface of structure 71 and then, forming a photoresist mask over lateral portions of the $SiO_2$ layer to be subsequently etched. A silicon nitride layer may be substituted for the all or portions of the protective $SiO_2$. Next, an evaporation process deposits about 30 nm of Ti and then deposits about 70 nm of nickel (Ni). Next, conventional strip removes the photoresist mask and overlaying metal to leave a Ni/Ti hard mask on the portion of the $SiO_2$ layer and InAlAs layer 56 to be protected. Next, a series of conventional dry etches, e.g. chlorine and nitrogen chemistry etches, removes unprotected portions of the $SiO_2$ layer and most or all of layer 56 of InAlAs to produce mesa structure 60. The dry etch is timed to near the interface between layers 54 and 56. Then, a wet etch dip removes any remaining unprotected InAlAs of the layer 56 and/or the top InAlGaAs in the layer 54. The wet etch is selective to stop on the buried sublayer of InP. Thus, the etches pattern both the upper optical cladding layer and a portion of the optical core layer thereby forming a rib-type optical waveguide.

After the dry etch, a wash with a conventional solvent, e.g., NMP, removes the remaining $SiO_2$ as well as the overlying hard metal mask.

Next, a conventional dry or wet etch of layer 54 that stops on InP produces lower mesa structure 62. Performing the etch includes first forming a photoresist mask to protect portions of the layer 54 for the lower mesa structure 62, upper mesa structure 60, and metal electrode 58. After the etch, a conventional strip step removes the photoresist mask to produce structure 73 of FIG. 10.

The upper and lower mesa structures 60, 62 define lateral dimensions of optical waveguide devices. The upper mesa 60 has a width of about 2 µm to 3 µm and the lower mesa 62 has a width of about 10 µm to 100 µm in optical waveguides A-D of FIGS. 1A-1B, and 5. The lower mesa structure 62 connects rib-structures for adjacent pairs of electro-optical phase shifters, i.e., pairs (28A, 28B) and (28C, 28D).

Figure 11:
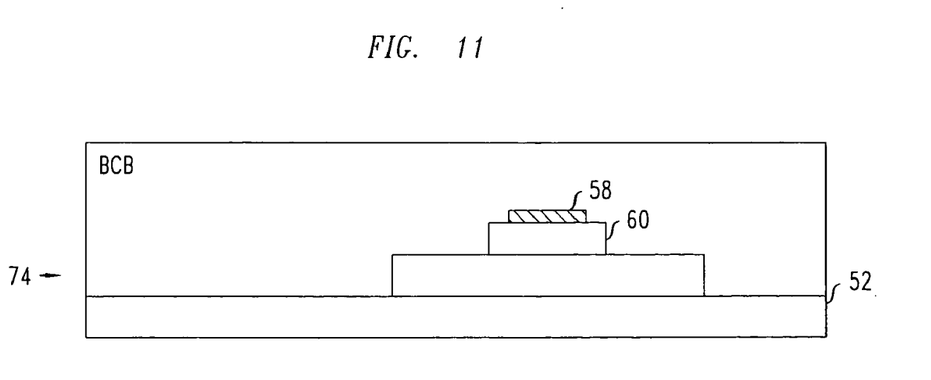
Figure 12:
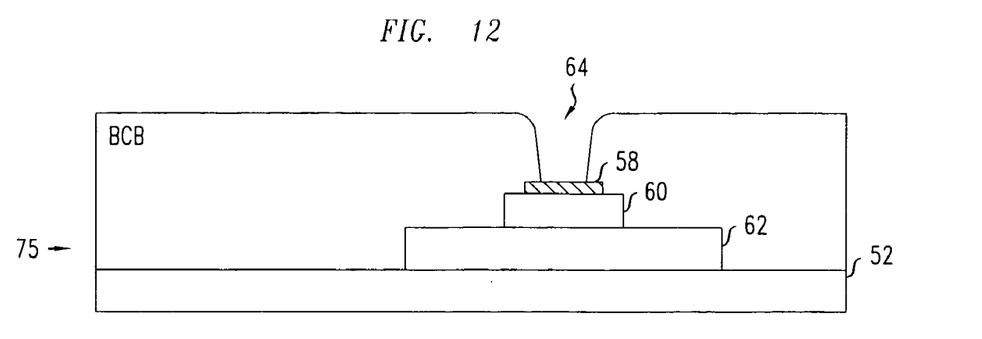

After forming structure 73, the fabrication method includes forming a protective layer of benzocyclobutene (BCB) to produce structure 74 of FIG. 11. The layer of BCB covers mesa structures 60, 62 and metal electrode 58. Forming the layer of BCB includes spin coating a liquid precursor of BCB to a desired thickness on a top surface of structure 73 and then heat, curing the precursor to from crosslinked BCB.

Next, the fabrication method includes performing making metallization layer 66 and metal buses 68 for electrodes and control lines of electro-optical phase shifters, e.g., lines 38A-38D and electrodes 36A-36D of FIGS. 1A-1D, and 5. The steps include forming a photoresist mask and then, heating structure 74 to about 135° C. for about 5 minutes so that surface tension forces cause reflow of the photoresist. The reflow thins edges of the etching window in the photoresist mask. The steps also include performing a dry etch to make a contact via 64 in the layer of BCB, and then, stripping the photoresist mask to produce structure 75 of FIG. 12. The etch is timed to cause etch through in thinned regions of the photoresist mask. This causes top edges of the contact via 64 to be rounded, which aids the subsequent formation of metallization layer 66. In the structure 75, the contact via 64 exposes a top surface of metal electrode 58. The steps also include performing an evaporation-deposition of metal and then, a stripping off the photoresist mask to produce metallization multilayer 66 of structure 76 as shown in FIG. 13. The metallization multilayer 66 has the top to bottom structure about 200 nm of Au and about 30 nm of Ti. The metallization multilayer 66 fills the previously formed contact vias 64 thereby providing electrical connections to the underlying metal electrodes 58. The steps also include performing another mask-controlled deposition of metal to produce low resistance metal buses 68 as shown in final integrated optical structure 77 of FIG. 14.

Figure 15:
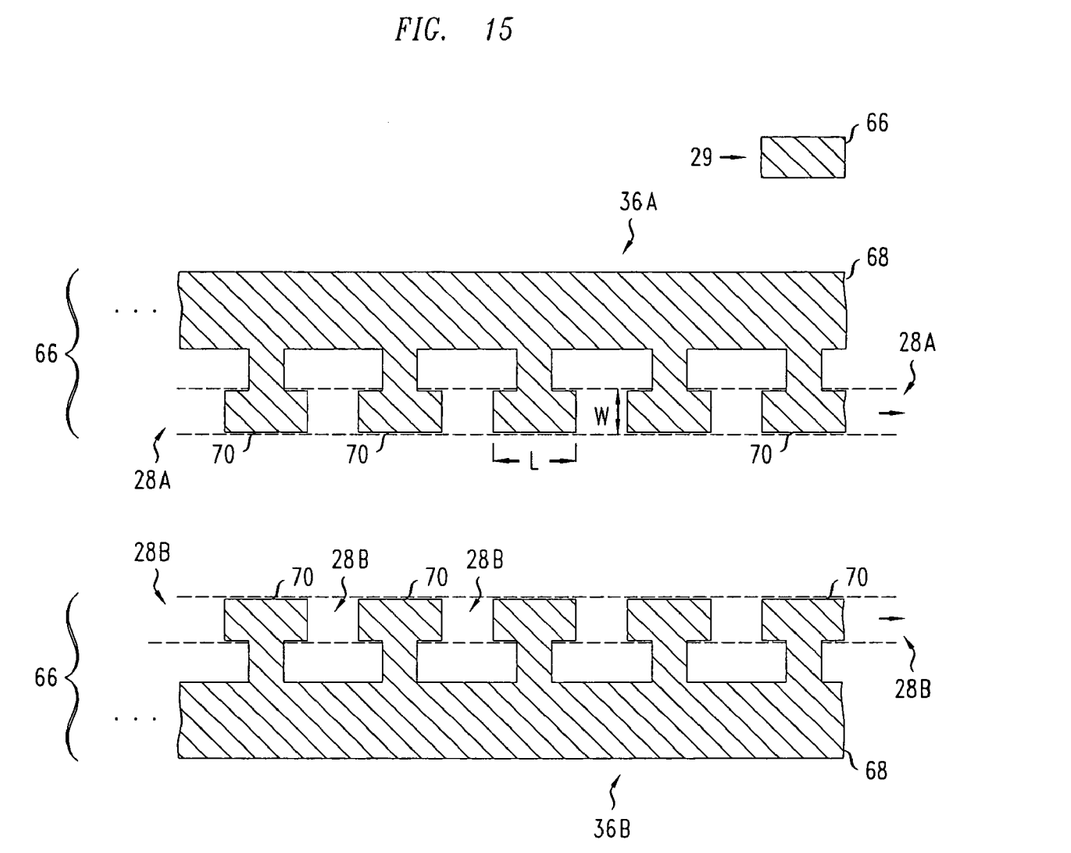
FIG. 15 is a top view of a portion of an integrated optical device with a pair of electro-optical phase modulators and associated electrodes as in FIGS. 1A-1B and 5.

In the integrated optical device, the geometry of control electrodes 36A-36D of FIGS. 1A-1D, and 5 aids to match group velocities of high frequency control waves and optical waves in electro-optical phase shifters 28A-28D. FIG. 15 shows one geometry for a pair of electrically coupled control electrodes 36A-36A and an associated DC biasing structure 29 that is formed in the same mesa structures 60, 62. Metal buses 68 of FIG. 14 connect to a series of transverse T-shaped structures 70 in metallization layer 66. The T-shaped structures 70 overlay junction areas of the III-V semiconductor so that each waveguide structure has the form of a parallel pair of long inductors crosslinked by capacitors, i.e., junction regions under the T-shaped structures 70. The dimensions of the T-shaped structures 70 are selected to tune capacitances so that phase velocities of high frequency control waves better match the group velocities of the optical waves in the electro-optical phase shifters 28A-28D. For high frequency operation, exemplary dimensions for the T-shaped structures 70 are a length, L, of about 48-30 µm and a width, w, of about 1.6 µm.

Figure 16A:
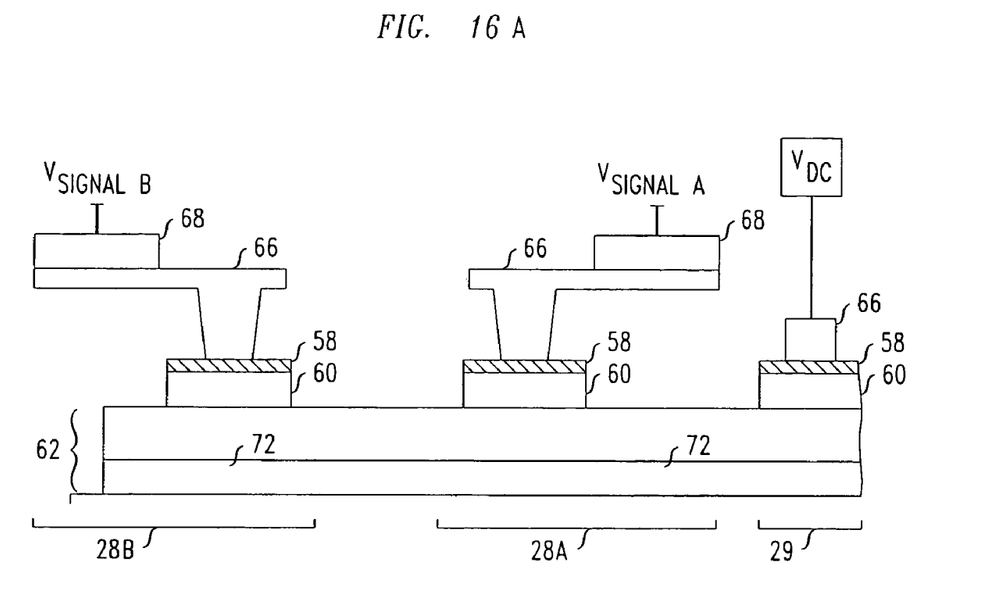
FIG. 16A is a cross-sectional view of the structure of FIG. 15.
Figure 16B:
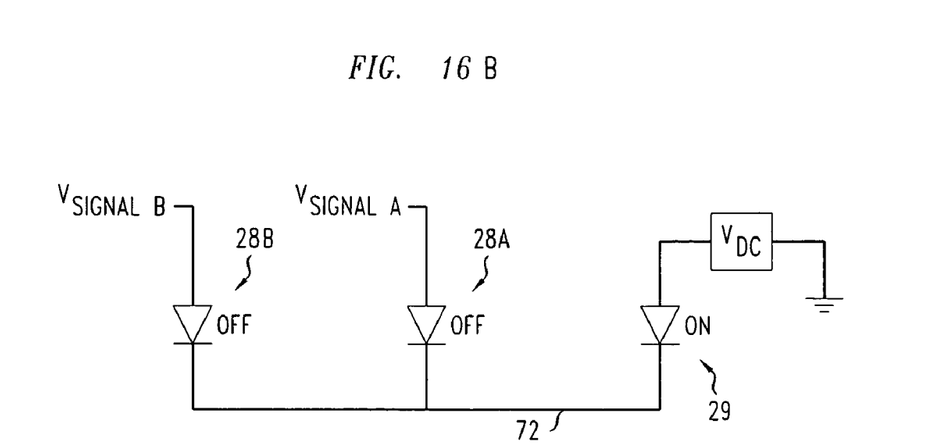
FIG. 16B is an equivalent circuit that illustrates biasing in the structure of FIGS. 15 and 16A.

FIG. 16A provides a cross-sectional view of the electrically coupled pair of electro-optical phase shifters 28A-28B and DC biasing structure 29 of FIG. 15. The heavily n-type doped InAlAs sublayer 72 of original layer 54 forms an electrical short between the adjacent III-V semiconductor heterostructures of electro-optical phase shifters 28A-28B and the DC biasing structure 29. The heterostructures in elements 28A, 28B, and 29 function as diodes as illustrated in an equivalent circuit shown in FIG. 16B. Due to the heavily n-type doped InAlAs sublayer 72, the diode structures for the DC biasing structure 29 and the electro-optical phase shifters 28A, 28B are connected in a back-to-back geometry. During operation, a large DC bias voltage, $V_{DC}$, connects across the diode structure of the voltage biasing structure 29 so that this diode is in the ON state. During operation, the diode structures of the electro-optical phase shifters 28A, 28B are biased by signal voltages $V_{signal\ A}$, $V_{signal\ B}$ that have smaller magnitudes than $V_{DC}$. For that reason, the diode structures associated with the phase shifters 28A, 28B are in the OFF state during operation.

Figure 17:
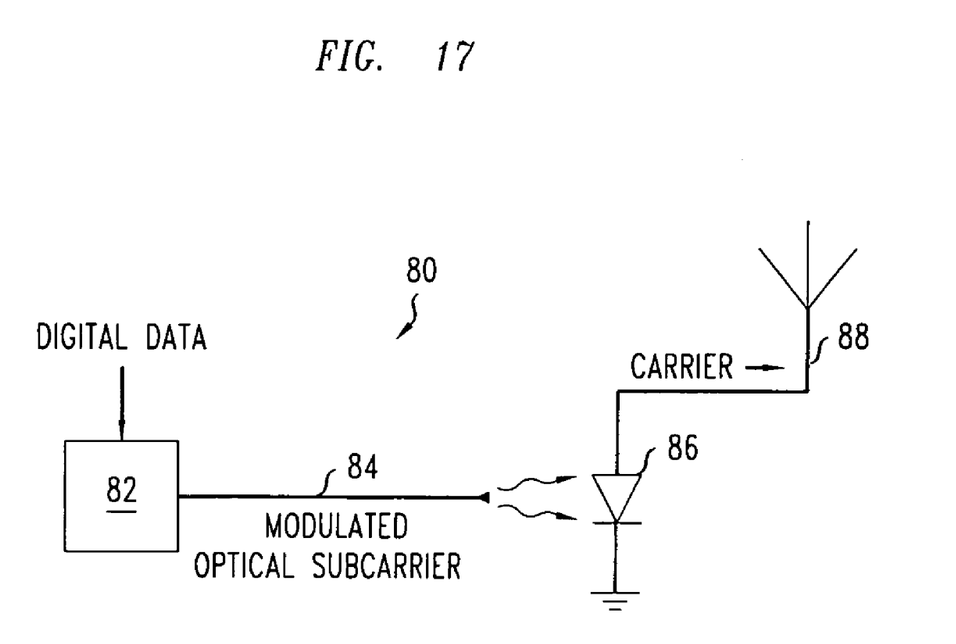
FIG. 17 shows a wireless transmitter that uses an electro-optical modulator to encode digital data at high frequencies.

Various optical transmitters described herein, e.g., transmitters 10 and 10' of FIGS. 1A and 5, are useful in high frequency wireless transmitters. FIG. 17 shows one such wireless transmitter 80. The wireless transmitter 80 includes an optical transmitter 82, an optical fiber link 84, a semiconductor junction light detector 86, e.g., a light detecting diode, and an antenna 88. The optical transmitter 82 encodes received digital data into a modulation of a subcarrier on an optical carrier wave. The optical carrier wave travels from the optical transmitter 82 to the semiconductor junction light detector 86 via the optical fiber link 84. The semiconductor junction light detector 86 produces an electrical carrier wave from the optical subcarrier and uses said electrical carrier to drive the antenna 88 thereby generating a wireless transmission at the high frequency associated with modulation frequency of the optical subcarrier.

Other embodiments of the invention will be apparent to those of skill in the art in light of the specification, drawings, and claims of this application.

What we claim is:

1. A method for transmitting digital data, comprising:
splitting a coherent optical carrier having an optical subcarrier into mutually coherent optical carriers;
producing sequences of phase shifts in each of the mutually coherent optical carriers; and
interfering the mutually coherent optical carriers to produce an output optical carrier whose optical subcarrier has modulated inphase and quadrature phase components with a sequence of pairs of values; and
wherein the pairs of values of the modulated inphase and quadrature phase components produced by the interfering correspond to coordinate pairs for signal points of one of the 4-PSK 2D constellation, the 16-QAM 2D constellation, and the 16-PSK 2D constellation.

2. The method of claim 1, wherein the pairs of values produced by the interfering correspond to the signal points to about 5% or better.

3. The method of claim 1, wherein the signal points represent the 4-PSK 2D constellation.

4. The method of claim 1 wherein the signal points represent one of the 16-QAM constellation and the 16-PSK constellation.

5. The method of claim 1, wherein the splitting forms four mutually coherent optical carriers and the producing makes sequences of phase shifts on the four mutually coherent optical carriers.

6. The method of claim 1, further comprising producing a time delay of the optical subcarrier of each mutually coherent optical carrier between performing the steps of splitting and interfering, magnitudes of differences between the time delays for different ones of the mutually coherent optical carriers differing from an integer number of periods of the optical subcarrier by at least 0.1 times the optical subcarrier's period.

7. The method of claim 1, wherein the producing further comprises:
passing each mutually coherent optical carrier through a separate electro-optical phase shifter while supplying a sequence of control voltages to the electro-optical phase shifters to produce the sequence of modulations thereon.

8. The method of claim 1 further comprising:
splitting the coherent optical carrier into four mutually coherent second optical carriers;
producing second sequences of second phase shifts on each of the mutually coherent second optical carriers; and
then, interfering the mutually coherent second optical carriers to produce an optical subcarrier having a second sequence of pairs of modulated inphase and quadrature phase components; and
wherein the pairs of values of the modulated inphase and quadrature phase components of the second sequence correspond to coordinate pairs for signal points of one of the 4-PSK 2D constellation, the offset 4-PSK 2D constellation, and the trapezoid 2D constellation.

9. The method of claim 8, wherein the pairs of values of the first sequence correspond to coordinate pairs for signal points of the 16-QAM 2D constellation and the pairs of values of the second sequence correspond to coordinate pairs for signal points of the 4-PSK 2D constellation or the offset 4-PSK 2D constellation.

10. The method of claim 8, wherein the pairs of values of the first sequence correspond to coordinate pairs for signal points of the 16-PSK 2D constellation and the pairs of values of the second sequence correspond to coordinate pairs for signal points of the 4-PSK 2D constellation or the trapezoid 2D constellation.

11. A system, comprising:
a light source to produce a coherent optical carrier with an optical subcarrier;
an electro-optical modulator comprising an optical splitter to split the optical carrier into mutually coherent optical carriers, a plurality of controllable phase shifters to process corresponding ones of the mutually coherent optical carriers, and an optical combiner to receive the processed mutually coherent optical carriers from the phase shifters, the electro-optical modulator and light source being configured such that the mutually coherent optical carriers processed by the phase shifters interfere in the optical combiner; and
a controller configured to apply a stream of sets of control voltages to the electro-optical modulator responsive to receiving a stream of digital data such that the modulator produces a stream of modulated pairs of values on inphase and quadrature phase components of the optical subcarrier, the pairs of values corresponding to coordinate pairs of signal points of one of the 4-PSK 2D constellation, the 16-QAM 2D constellation, and the 16-PSK 2D constellation.

12. The system of claim 11, wherein the pairs of values correspond to coordinate pairs of signal points of the 4-PSK 2D constellation to 5% or better.

13. The system of claim 11, wherein the pairs of values correspond to coordinate pairs of signal points of one of the 16-QAM constellation and the 16-PSK constellation to 5% or better.

14. The system of claim 11, wherein the optical splitter has four outputs and the optical combiner has four inputs; and
wherein the modulator comprises four optical waveguides, each waveguide connecting one of the outputs of the splitter to one of the inputs of the combiner such that each input is connected to one output, each waveguide including one of the controllable phase shifters, the controllable phase shifters being connected to receive the sets of control voltages applied by the controller.

15. The system of claim 14, wherein the waveguides have different lengths and wherein magnitudes of differences between the lengths of any two of the waveguides differ from an integer number of wavelengths of the optical subcarrier by at least 0.1 times the optical subcarrier's wavelength.

16. The system of claim 11, wherein the electro-optical modulator comprises a pair of cascaded first and second electro-optical modulators; and
wherein the first modulator is configured to respond to sets of the control voltages by modulating the optical subcarrier to produce a stream of modulated pairs of second values on inphase and quadrature phase components thereof, the pairs of second values corresponding to coordinate pairs of signal points of one of the 4-PSK 2D constellation, the trapezoid 2D constellation, and the offset 4-PSK 2D constellation.

17. The system of claim 11, wherein the controller is configured to cause the modulation of inphase and quadrature phase components of the optical subcarrier with two or more bits of digital data per symbol interval.

18. A system, comprising:
a light source to produce a coherent optical carrier with an optical subcarrier;
an electro-optical modulator comprising an optical splitter configured to receive the optical carrier and having four outputs, an optical combiner with four inputs, and four waveguides connecting the outputs to the inputs such that each input is connected to one of the outputs, each waveguide having an electro-optical phase shifter responsive to applied voltages, the electro-optical modulator and light source being configured such that optical carriers output by the waveguides interfere in the optical combiner in response to the source producing the coherent optical carrier; and
a controller being configured to apply a stream of sets of control voltages to the electro-optical phase shifters in response to receiving a stream of digital data such that the modulator produces a stream of modulated pairs of values on the inphase and quadrature phase components of the optical subcarrier, the modulated pairs of values corresponding to coordinate pairs of signal points of a 2D signal constellation whose signal points have equal lengths.

19. The system of claim 18, wherein the waveguides have different lengths and wherein magnitudes of differences between the lengths of any two of the waveguides differ from an integer number of wavelengths of the optical subcarrier by at least 0.1 times the optical subcarrier's wavelength.

20. The system of claim 19, wherein the signal points form a representation of one of the 4-PSK 2D constellation, the trapezoid 2D constellation, and the offset 4-PSK 2D constellation.

* * * * *